D. R. MURPHY.
VALVE.
APPLICATION FILED AUG. 16, 1919.
1,346,968.
Patented July 20, 1920.
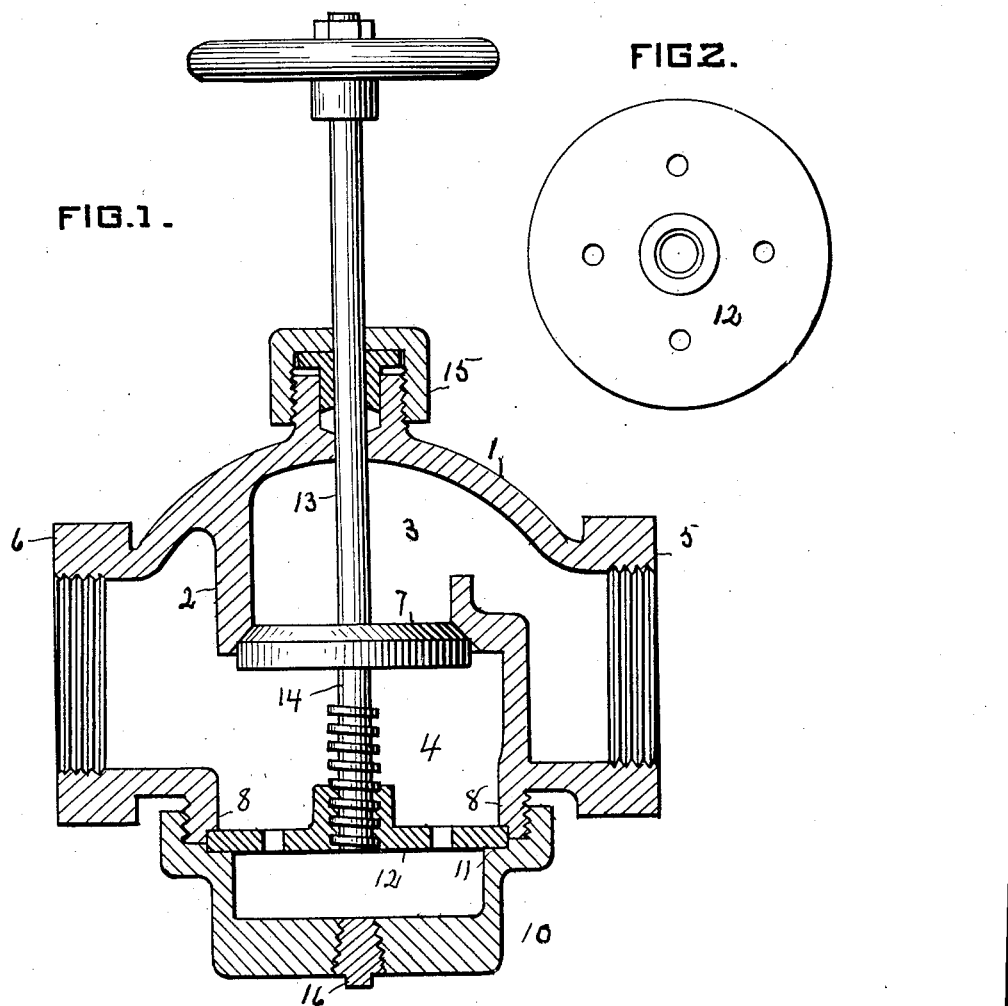
INVENTOR
Daniel R. Murphy

UNITED STATES PATENT OFFICE.

DANIEL R. MURPHY, OF UNIONTOWN, PENNSYLVANIA.

VALVE.

1,346,968.

Specification of Letters Patent.   Patented July 20, 1920.

Application filed August 16, 1919. Serial No. 317,932.

*To all whom it may concern:*

Be it known that I, DANIEL R. MURPHY, residing at Uniontown, in the county of Fayette and State of Pennsylvania, a citizen of the United States, have invented certain new and useful Improvements in Valves, of which improvements the following is a specification.

Valves of the type in which the movable member seats on a diaphragm dividing the shell into inlet and outlet chambers have heretofore had the stems of the movable member threaded above the valve disk so as to engage a threaded opening in the shell and also with the portion of the stem below the valve threaded to engage a threaded socket screwed to the underside of the shell.

As is well known the threaded portions of the valve are subject to the greatest wear and soon become wholly inoperative. When by reason of such wear of the threaded portions of either of the above constructions, the valve becomes inoperative, the entire valve must be replaced although only a small part of the valve has become inefficient, as repair or removal of the part is not practicable.

The invention described herein has for its object the construction of a valve in which the female member of the threaded portions is so constructed and secured within the valve case below the diaphragm as to permit of the easy substitution of a new part when the one in use becomes inefficient. It is a further object of the invention to provide a chamber for the collection of dirt, etc., and from which the dirt can be easily removed. The invention is hereinafter more fully described and claimed.

In the accompanying drawings forming a part of this specification, Figure 1 is a sectional elevation of a valve embodying the improvement claimed herein and Fig. 2 is a plan view of the removable and renewable member.

In the practice of the invention the shell 1 of the valve is formed with a diaphragm or partition 2 so arranged as to divide the interior of the valve into two chambers 3 and 4 connected respectively with the nozzles 5 and 6. The chambers 3 and 4 are connected by an opening through the diaphragm and the peripheral wall of such opening is constructed to form a seat for the valve disk 7. An opening is formed through the shell, the center of the opening being coincident with the center of the valve disk 7, the periphery of said opening being formed by a flange 8. This flange is threaded preferably externally for engaging the internal threads formed in the rim of the cap 10. The cap is so constructed as to form a shoulder 11 adapted to overlap and bear on a disk 12 having its periphery resting in a groove formed in the flange 8, thereby firmly clamping the disk in position, said disk having a threaded opening therethrough for the reception of the threaded portion of a stem of the valve 7. In the embodiment of the invention shown in Fig. 1, the disk 12 is arranged on that side of the valve disk opposite that from which the operating stem 13 extends and hence the valve disk is provided with an auxiliary stem 14 which extends down through the disk and is threaded so that when rotated it will shift the valve disk toward and from the seat. As is customary, the operating stem is surrounded by a suitable stuffing box 15.

As hereinbefore stated the threaded portions of a valve are the parts most subjected to wear and this wear in valves as heretofore constructed, made it necessary to discard the entire valve or some other portion the manufacture of which involves considerable labor and expense. In the construction described and claimed herein the wear of the threaded portions necessitates merely the removal of the disk 12 which can be quickly done by removing the cap 10. In case the threaded stem is worn a new thread can be cut thereon and a disk with a smaller opening therethrough can be used.

As shown, the cap 10 is so constructed that a chamber is formed outside of the disk through which holes are formed permitting dirt, etc., to pass into said chamber from which it can be removed by taking off the cap or the latter may be provided with an opening normally closed by a removable plug 16. By the removal of this plug the dirt, etc., can be blown out of the chamber.

As the clamping of the disk 12 between shoulders on the shell and the cap 10 is the sole means employed for holding the disk and parts carried thereby in operative relation to other portions of the valve mechanism, the removal of the cap and the operating handle on the main stem will permit of the removal of the disk, stem and valve disk. And further, the loosening or removal of the cap will permit of the turning of the stem and valve disk 7 for the grinding of the seat and valve disk to form a tight joint between them.

I claim herein as my invention:

1. A valve having in combination a case or shell having inlet and outlet ports or openings, a valve controlling the flow of fluid through the case or shell and provided with a main and a threaded auxiliary stem, a removable disk having a threaded opening therethrough for the reception of the threaded stem and arranged within the shell but not attached thereto and means for holding the disk against the shell.

2. A valve having in combination a case or shell having inlet and outlet ports or openings and an opening intermediate the inlet and outlet ports, a valve controlling the flow of fluid through the case or shell and provided with a main and a threaded auxiliary stem, a removable disk having no supporting engagement with the shell and having the threaded opening therethrough to receive the auxiliary stem, and a removable cover for the intermediate opening and adapted to clamp the disk in position in the case or shell.

3. A valve having in combination a case or shell having inlet and outlet ports and an opening intermediate the said ports, a valve controlling the flow of fluid through the case or shell, a stem for said valve having a threaded portion, a disk having a threaded opening therethrough, and openings for the escape of dirt, etc., a cap for said intermediate opening and adapted to clamp the disk in position, the cap and parts of the shell adjacent to the intermediate opening being so constructed as to form a chamber outside of the disk.

4. A valve having in combination a case or shell having a diaphragm or portion with an opening therethrough, the case or shell having a port connected to the chamber on one side of the diaphragm and an opening connected to the chamber on the opposite side of the diaphragm, said opening being in line with the opening through the diaphragm and the walls of said opening being constructed to form a seat or shoulder, a valve controlling the flow of fluid through the diaphragm and having a main and a threaded auxiliary stem, a disk having a threaded opening therethrough for engagement with the auxiliary stem and adapted to seat in the opening of the shell and a removable cap screwing onto the shell and adapted to clamp the disk on its seat and hermetically close said opening.

5. A valve having in combination a case or shell having a diaphragm or partition having an opening therethrough, the case or shell having ports connected respectively with the chambers on opposite sides of the diaphragm, a valve controlling the flow of fluid through the diaphragm, and having a main stem and a threaded auxiliary stem, the case or shell having an opening in line with the opening through the diaphragm, said opening being slightly larger than the valve, a disk having a threaded opening therethrough for the reception of the auxiliary stem and arranged in a seat formed in the wall of the opening in the shell and a cap for said opening and adapted to clamp the disk on its seat and hermetically close said opening.

6. A valve having in combination a case or shell having inlet and outlet ports or openings, a diaphragm arranged transverse of the shell and having an opening therethrough, an opening in the case or shell having its axis coincident with the axis of the opening through the diaphragm, a valve controlling the flow of fluid through the opening in the diaphragm and provided with a main and a threaded auxiliary stem, a disk arranged in the opening in the case or shell but not directly engaging the latter and having a threaded opening for the reception of the threaded stem, a cap for holding the disk in operative position, said parts being so constructed as to permit the removal of the disk without shifting the valve and parts connected thereto.

In testimony whereof, I have hereunto set my hand.

DANIEL R. MURPHY.